United States Patent Office 2,891,931
Patented June 23, 1959

2,891,931

POLYMERIC CALCIUM SALT

Costas H. Basdekis, Longmeadow, Mass., assignor to Monsanto Chemical Company, St. Louis, Mo., a corporation of Delaware No Drawing. Application August 8, 1952
Serial No. 303,395

1 Claim. (Cl. 260—80)

This invention relates to new polymeric compounds useful in diversified fields. More specifically the invention relates to water-soluble polymeric derivatives and methods for preparation by the hydrolysis of acrylonitrile or methacrylonitrile polymers with lime.

It is well known that polyacrylonitrile is a water-insoluble polymer and that by suitable hydrolysis procedures it can be converted into useful water-soluble derivatives. For example, the hydrolysis of acrylonitrile polymers in the presence of strong acids, caustic alkali or ammonia will yield water-soluble polymeric acids or salts of the acids. It is also known that by reaction with calcium compounds the soluble polymeric acids and their alkali metal and ammonium salts can be converted into water-insoluble polymers.

The primary purpose of this invention is to provide valuable products, which are partially water-soluble and which swell when contacted with an aqueous medium. A further purpose of this invention is to provide methods for convenient preparation of a class of compounds useful in many applications as are described hereinafter and many others known to the art for water-soluble polymers. The compositions are also useful in practicing the method described in copending application, Serial No. 271,280, filed February 12, 1952, by Ross M. Hedrick and David T. Mowry, now issued as United States Patent No. 2,625,529.

When polymers of acrylonitrile or methacrylonitrile are hydrolyzed with calcium hydroxide in an aqueous medium the insoluble polymers are converted into salts of polymeric acids. The nitrile radicals are converted first into amide radicals and then with evolution of ammonia into carboxylic acid and calcium carboxylate groups. In order to accomplish the hydrolysis at a practicable rate it is necessary to conduct the reaction at elevated temperatures, for example above 75° C., and preferably above 85° C. or close to the boiling point of the reaction mixture. At the beginning of the reaction the insoluble polymeric nitrile is suspended in the aqueous medium and remains in the suspended state throughout the reaction. At all times the polymer is apparently insoluble, but changes in color from white to a strong orange or reddish brown color, and finally back to white.

Polyacrylonitrile has a nitrogen content of about 26 percent by weight, and as the hydrolysis proceeds ammonia is evolved and the nitrogen content is reduced. By nitrogen analysis the process of the reaction can be followed, the nitrogen content representing the incompletely hydrolyzed cyano groups. If the hydrolysis is interrupted before the nitrogen content is reduced to 5.5 percent by weight, the product is water-insoluble and is not useful as a soil conditioning agent. After the nitrogen content reaches 5.5 percent and before it falls below 3.5 percent, the products containing about 24 to 36 percent of the original nitrogen are partially soluble in and are severely swollen by cold water. In this state the polymers are unusually effective in inducing the formation of water-stable aggregates in surface soils. When the hydrolysis reaction is continued until the nitrogen content is less than 3.5 percent, the water sensitivity is reduced and the products have greatly reduced utility in treating soils. Preferred practice involves hydrolysis to a nitrogen content between four and five percent, at which point from 26 to 34 percent of the original nitrogen remains in the polymer.

Although polyacrylonitrile and polymethacrylonitrile are of particular importance in the practice of this invention, copolymers of acrylonitrile and methacrylonitrile with minor quantities of one or more other monomers are also useful. Thus, copolymers of 75 percent by weight of either acrylonitrile and/or methacrylonitrile, and up to 25 percent of styrene, isobutylene, vinyl chloride, vinylidene chloride, maleic anhydride, vinyl acetate and other copolymerizable monomers may be hydrolyzed to useful products. In the use of copolymers the desired nitrogen content is based upon the nitrile containing monomer of the polymer, and thus the hydrolysis is conducted until the specified quantity of nitrogen is evolved in the form of ammonia.

In the preparation of new and valuable compounds, the hydrolysis of the nitrile polymer is conducted at elevated temperatures in an aqueous slurry, charging either calcium hydroxide or calcium oxide as the hydrolysis agent, the reaction being continued until the nitrogen content of the product is between 3.5 and 5.5 percent by weight based on the nitrile monomer content of the original polymer. The nitrogen content may be determined by analysis of a sample from the reaction vessel, but with the use of a predetermined deficiency of the stoichiometric proportion of calcium compound, the reaction will stop at the desired nitrogen analysis. Alternatively, the reaction can be conducted by using an excess of calcium compound and interrupting the reaction short of completion, when the nitrogen content is within the desired range. The latter method requires a standardized procedure using fixed temperatures, proportions of reagents, and conditions of operation in which case the time of reaction will determine the nitrogen content. A single trial run will enable the fixing of the time of reaction so that the product will always have a nitrogen content with the desired range.

When the hydrolysis reaction stops, or is stopped short of completion, it is necessary to separate the product from the aqueous slurry in which it is prepared. The product which appears initially to be a finely divided solid suspended in the aqueous reaction medium settles rapidly when cooled and cannot be conveniently redispersed in the medium. Although conventional separation procedures are not usually feasible, a substantial portion of the water may be removed by decantation and the resultant gelatinous water-swollen polymer may be dried in a vacuum pan or other type of dryer. The brittle resin so obtained may be pulverized and screened to a fine solid powder in which form it is most efficiently used. Many of the uses of the polymer involve the aqueous form, thereby obviating the drying step.

The polymers claimed herein and prepared in accordance with the claimed method are sufficiently water-soluble to enable their use as dispersing agents. In the presence of water they are sticky gelatinous substances having utility in the manufacture of adhesives. Further applications lie in the field of fiber technology, where they may be used as sizing agents and stiffening agents of exceptional quality because of their ability to be insolubilized by combination with polyvalent ions. The compositions are also valuable as wood sealers or in manufacturing other coating compositions.

The utility of these polymers as soil conditioning agents is most conveniently measured by a wet screening test, In accordance with this procedure 100 grams of a standard soil, for example Miami silt loam, is pulverized to pass a 0.25 mm. sieve and mixed with 30 ml. of distilled water containing a predetermined proportion of the polymer. After the soil and polymer are well mixed, they are pressed through a four mm. screen and the resulting soil crumbs are dried for two days in a warm room at low humidity and then blown with dry air for ten minutes to complete the drying. Forty-gram samples are placed on the top sieve in a set of three telescopic sieves, 0.84 mm., 0.42 mm., and 0.25 mm. arranged in order of decreasing size. The screen assembly is then raised and lowered in water through a distance of 1.5 inches at the rate of 30 cycles per minute for 30 minutes. At the end of the time the sieves are raised, allowed to drain and the remaining soil dried at 80° C. and weighed. The percentage of the crumbs remaining on all of the sieves is determined and used as a measure of the water-stability of the soil aggregates. The water-stability of the aggregates greater than 0.25 mm. appearing in the following experimental data were determined by this method.

Further details of the invention are set forth with respect to the following specific examples:

EXAMPLE 1

A 106-gram sample of polyacrylonitrile and 56 grams of calcium hydroxide was suspended in 500 cc. of water in a liter flask provided with a stirring mechanism. The reaction mixture was heated to reflux temperature (approximately 100° C.) for 22 hours. The mixture changed from a white slurry to an orange colored slurry and finally back to white. The product was charged with about ten percent by volume of ethyl alcohol and filtered. After air drying in an oven of 110° C. a white free-flowing product was obtained. Analysis showed that it contained 4.37 percent nitrogen and 2.0 percent unreacted calcium hydroxide.

The polymer was applied to a sample of Miami silt loam using 0.063 weight percent of polymers based upon the soil treated. Aggregates prepared and tested by the wet screening method were found to have 66 percent water-stability.

EXAMPLE 2

A series of partially hydrolyzed polyacrylonitriles were prepared using varying proportions of reagents and reaction times and analyzed for nitrogen content. Each was used to treat soil (Miami silt loam) and the treated soils were measured for aggregate stability. The following table sets forth the relationship between nitrogen content and utility as soil aggregation agents, and compares them with calcium polyacrylates prepared by other methods.

Table

| Percent Nitrogen in Samples | Percent of Original Nitrogen | Percent CN hydrolyzed to NH₃ | Percent Aggregate Stability |
| --- | --- | --- | --- |
| [1] 0.0 | -------- | -------- | 0.5 |
| [2] 0.0 | -------- | -------- | 2.3 |
| 3.44 | 23.8 | 76.2 | 11 |
| 3.94 | 24.8 | 75.2 | 37.8 |
| 3.92 | 24.3 | 75.7 | 37.8 |
| 3.78 | 25.5 | 74.5 | 48.8 |
| 4.11 | 26.4 | 73.6 | 57.5 |
| 4.43 | 27.9 | 72.1 | 66.0 |
| 5.04 | 32.0 | 68.0 | 57.5 |
| 5.22 | 35.0 | 65.0 | 16.5 |
| 5.72 | 37.5 | 62.5 | 7.5 |
| 6.52 | 39.4 | 60.6 | 3.0 |
| 11.02 | 57.8 | 42.2 | 0.25 |
| 16.9 | 73.5 | 26.5 | 0.5 |

[1] Sample prepared by polymerization of calcium acrylate.
[2] Sample prepared by polymerization of acrylic acid and subsequently converted to calcium salt by reaction with calcium hydroxide.

EXAMPLE 3

Using the procedure of the preceding examples a copolymer of 95 percent acrylonitrile and five percent of styrene was hydrolyzed until the nitrogen content was 3.95. When dispersed in Miami silt loam to the extent of 0.063 percent the aggregate stability was found to be 39.3 percent.

EXAMPLE 4

A copolymer of 80 percent by weight acrylonitrile and 20 percent isobutylene was hydrolyzed in the manner described in the preceding examples. A partially hydrolyzed product containing nitrogen was thereby obtained which was found to be useful in aggregating soils.

The expression, "water-soluble," as used throughout the specification is intended in the broad sense, and includes non-Newtonian solutions as well as the so-called "true solutions." Thus, the water-soluble polymers will include those which can be swollen by water to an infinite extent, and these are considered to be completely water-soluble. Other polymers which are swollen by water to a substantial but limited extent are termed "partially water-soluble." The solubility is evidenced by the capacity of the polymer-water composition for aggregating soil, since the ability to adsorb on the soil and manifest a substantial increase in the proportion of water-stable aggregates therein, depends upon the hydrophilic molecular dispersibility of the polymer in the soil water, whereby polymeric ions are formed. This solubility is regarded as necessary for the diffusion of the polymer mass through the soil moisture to attain optimum soil aggregation.

What I claim is:

A method of preparing calcium polyacrylate which comprises heating polyacrylonitrile in an aqueous suspension in the presence of calcium hydroxide until the nitrogen content of the hydrolyzed product is from 3.5 to 5.5 percent.

References Cited in the file of this patent

UNITED STATES PATENTS

| | | |
| --- | --- | --- |
| 1,984,417 | Mark et al. | Dec. 18, 1934 |
| 2,625,529 | Hedrick et al. | Jan. 13, 1953 |

FOREIGN PATENTS

| | | |
| --- | --- | --- |
| 501,726 | Belgium | Mar. 7, 1951 |